United States Patent
Kotteri et al.

(10) Patent No.: US 10,310,800 B2
(45) Date of Patent: Jun. 4, 2019

(54) SELECTIVE ROUTING OF AUDIO BETWEEN APPLICATIONS

(71) Applicant: Microsoft Technology Licensing, LLC, Redmond, WA (US)

(72) Inventors: Kishore A. Kotteri, Sammamish, WA (US); Firoz Dalal, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 147 days.

(21) Appl. No.: 15/427,954

(22) Filed: Feb. 8, 2017

(65) Prior Publication Data
US 2018/0225079 A1    Aug. 9, 2018

(51) Int. Cl.
| | | |
|---|---|---|
| G06F 3/16 | (2006.01) | |
| H04L 29/06 | (2006.01) | |
| G06F 21/10 | (2013.01) | |

(52) U.S. Cl.
CPC .............. *G06F 3/162* (2013.01); *G06F 3/165* (2013.01); *G06F 21/10* (2013.01); *H04L 63/102* (2013.01); *H04L 65/605* (2013.01)

(58) Field of Classification Search
CPC .......... G06F 3/162; G06F 3/165; G06F 21/10; H04L 63/10
USPC .................... 700/94; 709/201–207, 217–248
See application file for complete search history.

(56) References Cited

U.S. PATENT DOCUMENTS

| | | | | |
|---|---|---|---|---|
| 7,093,014 B2* | 8/2006 | Nino | ....................... | H04L 67/16 709/219 |
| 7,840,691 B1* | 11/2010 | De Bonet | .............. | G06Q 30/02 705/14.49 |
| 7,903,579 B2 | 3/2011 | Hughes et al. | | |
| 8,130,916 B2 | 3/2012 | Lynch et al. | | |
| 8,358,659 B2 | 1/2013 | Lingafelt et al. | | |

(Continued)

FOREIGN PATENT DOCUMENTS

| | | |
|---|---|---|
| CA | 2365427 | 6/2003 |
| CN | 105872897 | 8/2016 |

(Continued)

OTHER PUBLICATIONS

"About Media Foundation", Retrieved from https://docs.microsoft.com/en-us/windows/desktop/medfound/about-the-media-foundation-sdk, May 31, 2018, 3 Pages.

(Continued)

*Primary Examiner* — Hemant S Patel
(74) *Attorney, Agent, or Firm* — Klarquist Sparkman, LLP

(57) ABSTRACT

In a computer system that provides for routing of audio content of a target audio application to a requestor audio application, an audio playback/routing manager manages audio routing between audio applications. For example, a requestor audio application may specify a target audio application from which audio content is to be received. An audio playback/routing manager can determine the audio content of the target audio application and provide the requested audio content to the requestor audio application. In this way, rather than receiving all of the audio content being rendered to an audio endpoint, which may include audio content of multiple applications, the requestor audio application can receive only audio content of one or more particular target audio applications.

20 Claims, 7 Drawing Sheets

(56) References Cited

U.S. PATENT DOCUMENTS

| | | | |
|---|---|---|---|
| 8,559,320 | B2 | 10/2013 | Khanduri |
| 8,625,767 | B2 | 1/2014 | Byrne et al. |
| 8,885,457 | B2 | 11/2014 | Kadakia et al. |
| 9,152,374 | B2 | 10/2015 | Dantrey |
| 9,319,792 | B1 | 4/2016 | Coleman et al. |
| 2002/0133354 | A1 | 9/2002 | Ross et al. |
| 2002/0147840 | A1* | 10/2002 | Mutton .................. H04L 29/06 709/239 |
| 2003/0212788 | A1 | 11/2003 | Wilding et al. |
| 2007/0112563 | A1 | 5/2007 | Krantz et al. |
| 2007/0286351 | A1 | 12/2007 | Ethier et al. |
| 2013/0067050 | A1 | 3/2013 | Kotteri et al. |
| 2013/0090922 | A1 | 4/2013 | Lim et al. |
| 2013/0171987 | A1 | 7/2013 | Sterman et al. |
| 2014/0052438 | A1 | 2/2014 | Yerrace et al. |
| 2014/0115479 | A1* | 4/2014 | Wang .................. H04L 67/322 715/727 |
| 2014/0365408 | A1 | 12/2014 | Snyder et al. |
| 2015/0139616 | A1 | 5/2015 | Lindroos et al. |
| 2016/0285752 | A1 | 9/2016 | Joshi |

FOREIGN PATENT DOCUMENTS

| | | |
|---|---|---|
| EP | 1622349 | 2/2006 |
| WO | WO 2012/056198 | 5/2012 |
| WO | WO 2013/000218 | 1/2013 |

OTHER PUBLICATIONS

"DirectSound—Windows Vista/Windows 7", Retrieved from https://en.wikipedia.org/wiki/DirectSound#Windows_Vista.2FWindows_7, Retrieved on Jan. 30, 2017, 4 Pages.
"Error Codes in Device Manager in Windows", Retrieved from https://support.microsoft.com/en-us/help/310123/error-codes-in-device-manager-in-windows, Retrieved on Jan. 30, 2017, 26 Pages.
"Improving Audio Quality in VoIP Conferencing Services", In White Paper of Radisys, Mar. 2009, Mar. 2009, 9 Pages.
"International Search Report and Written Opinion Issued in PCT Application No. PCT/US18/016532", dated Apr. 18, 2018, 13 Pages.
"Is There a Way to Reset Audio on Windows?", Retrieved from http://superuser.com/questions/459871/how-to-reset -audio-on-windows, Aug. 4, 2012, 2 Pages.
"Is There a Way to Restart Audio without Restarting a Windows 7 Computer?", Retrieved from http://superuser.com/questions/521955/is-there-a-way-to-restart-audio-without-restarting-a-windows-7-computer, Dec. 20, 2012, 3 Pages.
"The Audio Service is not Running", Retrieved from https://social.technet.microsoft.com/Forums/ office/ en-US/56d0bf26-d5a7-42fd-9b95-d6ba89c53f6e/the-audio-service-is-not-running?forum=w7itproperf, Nov. 29, 2009, 26 Pages.
"The AudioSrv Service is not Auto Starting. It Starts by Just Simply Starting from the Task Manager, but it does not Start's Automatically", Retrieved from https://answers.microsoft.com/en-us/windows/forum/windows_vista-pictures/the-audiosrv-service-is-not-auto-starting-it/d28ef94a-b356-4e99-8167-52e1fdb3f2df, Apr. 14, 2012, 5 Pages.
"User-Mode WDM Audio Components", Retrieved from https://msdn.microsoft.com/en-us/windows/hardware/drivers/audio/user-mode-wdm-audio-components, Apr. 20, 2017, 2 Pages.
"Windows Multimedia", Retrieved from https://msdn.microsoft.com/en-us/library/windows/desktop/dd743883(v=vs.85).aspx, May 31, 2018, 2 Pages.
Johnstone, Curtis, "A Primer on Lync Audio Quality Metrics", Retrieved from http://blog.insidelync.com/2012/06/a-primer-on-lync-audio-quality-metrics/, Jun. 28, 2012, 4 Pages.
Russinovich, Mark, et al., "Chapter 4. Management Mechanisms", In Windows Internals, 6th Edition, Part 1, Microsoft Press, 2012, 42 Pages.

"AudioCaptureRaw Walkthrough: C++", http://web.archive.org/web/20110903013346/http:/research.microsoft.com/en-us/um/redmond/projects/kinectsdk/docs/AudioCaptureRaw_Walkthrough.pdf, Published on: Sep. 3, 2011, pp. 1-12.
"Total Recorder Developer Edition", http://web.archive.org/web/20100106132541/http:/totalrecorder.com/productfr_trDEV.htm, Published on: Jan. 6, 2010, 2 pages.
Benjamin, Jeff, "How to route audio for specific apps to different outputs in OS X", http://www.idownloadblog.com/2014/04/29/how-to-route-audio-for-specific-apps-to-different-outputs-in-os-x/, Published on: Apr. 29, 2014, 5 pages.
Breen, Christopher, "Macworld Secrets: Capture audio with Soundflower", http://www.macworld.co.uk/feature/apple/macworld-secrets-capture-audio-soundflower-3484023/, Published on: Sep. 11, 2012, 4 pages.
"Windows Audio Architecture", *Microsoft Developer Resources, Hardware Dev Center*, https://msdn.microsoft.com/en-us/windows/hardware/drivers/audio/windows-audio-architecture, Last updated: Jan. 24, 2017, Accessed on or before: Jan. 30, 2017, 4 pages.
"Windows.Media.Audio namespace", *Microsoft Developer Resources, Windows Dev Center*, https://msdn.microsoft.com/en-us/library/windows/apps/windows.media.audio.aspx, Accessed on or before: Jan. 30, 2017, 4 pages.
"User-Mode Audio Components", *Microsoft Developer Resources, Windows Dev Center*, https://msdn.microsoft.com/en-us/library/windows/desktop/dd316780(v=vs.85).aspx, Accessed on or before: Jan. 30, 2017, 4 pages.
"DeviceTopology API", *Microsoft Developer Resources, Windows Dev Center*, https://msdn.microsoft.com/en-us/library/windows/desktop/dd370809(v=vs.85).aspx, Accessed on or before: Jan. 30, 2017, 3 pages.
"Audio Sessions", *Microsoft Developer Resources, Windows Dev Center*, https://msdn.microsoft.com/en-us/library/windows/desktop/dd370796(v=vs.85).aspx, Accessed on or before: Jan. 30, 2017, 4 pages.
"Enumerating all processes", *Microsoft Developer Resources, Windows Dev Center*, https://msdn.microsoft.com/en-us/library/windows/desktop/ms682623(v=vs.85).aspx, Accessed on or before: Jan. 30, 2017, 4 pages.
"Using the Get-Process Cmdlet", *Microsoft TechNet*, https://technet.microsoft.com/en-us/library/ee176855.aspx, Accessed on or before: Jan. 30, 2017, 4 pages.
"Managing the Audio Session", Microsoft Developer Resources, Windows Dev Center, https://msdn.microsoft.com/en-us/library/windows/desktop/dd374921(v=vs.85).aspx, Accessed on or before: Jan. 30, 2017, 14 pages.
"IAudioClient::Initialize method", *Microsoft Developer Resources, Windows Dev Center*, https://msdn.microsoft.com/en-us/library/windows/desktop/dd370875(v=vs.85).aspx, Accessed on or before: Jan. 30, 2017, 12 pages.
"IAudioClient interface", *Microsoft Developer Resources, Windows Dev Center*, https://msdn.microsoft.com/en-us/library/windows/desktop/dd370865(v=vs.85).aspx, Accessed on or before: Jan. 30, 2017, 3 pages.
"AudioGraph.CreateSubmixNode( ) | createSubmixNode( ) method", *Microsoft Developer Resources, Windows Dev Center*, https://msdn.microsoft.com/en-us/library/windows/apps/dn914237, Accessed on or before: Jan. 30, 2017, 2 pages.
"Audio graphs", *Microsoft Developer Resources, Windows Dev Center*, https://msdn.microsoft.com/en-us/windows/uwp/audio-video-camera/audio-graphs, Accessed on or before: Jan. 30, 2017, 21 pages.
"Core Audio Interfaces", *Microsoft Developer Resources, Windows Dev Center*, https://msdn.microsoft.com/en-us/library/windows/desktop/dd370805(v=vs.85).aspx, Accessed on or before: Jan. 30, 2017, 5 pages.
"AudioGraph class", *Microsoft Developer Resources, Windows Dev Center*, https://msdn.microsoft.com/library/windows/apps/dn914176, Accessed on or before: Jan. 30, 2017, 6 pages.
Tsigkogiannis, Ilias, "What's New in Audio for Windows 10," *Microsoft | Developer, driver writing != bus driving*, https://blogs.

(56) References Cited

OTHER PUBLICATIONS msdn.microsoft.com/iliast/2016/01/28/whats-new-in-audio-for-windows-10/, Published on: Jan. 28, 2016, Accessed on or before: Jan. 30, 2017, 10 pages.
"Architectural Overview", *Microsoft Developer Resources, Hardware Dev Center*, https://msdn.microsoft.com/en-us/windows/hardware/drivers/audio/architectural-overview, Last updated: Jan. 24, 2017, Accessed on or before: Jan. 30, 2017, 5 pages.
"Device Formats", *Microsoft Developer Resources, Windows Dev Center*, https://msdn.microsoft.com/en-us/library/windows/desktop/dd370811(v=vs.85).aspx, Accessed on or before: Jan. 30, 2017, 3 pages.
"Low Latency Audio—Windows Audio Stack", *Microsoft Developer Resources, Hardware Dev Center*, https://msdn.microsoft.com/en-us/windows/hardware/drivers/audio/low-latency-audio#windows_audio_stack, Accessed on or before: Jan. 30, 2017, 22 pages.
"Audio Signal Processing Modes", *Microsoft Developer Resources, Hardware Dev Center*, https://msdn.microsoft.com/en-us/windows/hardware/drivers/audio/audio-signal-processing-modes, Last updated: Jan. 24, 2017, Accessed on or before: Jan. 30, 2017, 18 pages.
"Capturing a Stream", *Microsoft Developer Resources, Windows Dev Center*, https://msdn.microsoft.com/en-us/library/windows/desktop/dd370800(v=vs.85).aspx, Accessed on or before: Jan. 30, 2017, 5 pages.
"IAudioCaptureClient interface", *Microsoft Developer Resources, Windows Dev Center*, https://msdn.microsoft.com/en-us/library/windows/desktop/dd370858(v=vs.85).aspx, Accessed on or before: Jan. 30, 2017, 2 pages.
"About WASAPI", *Microsoft Developer Resources, Windows Dev Center*, https://msdn.microsoft.com/en-us/library/windows/desktop/dd371455(v=vs.85).aspx, Accessed on or before: Jan. 30, 2017, 2 pages.
"Media Support in the Microsoft Windows Real-Time Communications Platform", *Microsoft Developer Network*, https://msdn.microsoft.com/en-us/library/ms997607.aspx, Published on: Nov. 2001, Updated on: Jun. 2005, Accessed on or before: Jan. 30, 2017, 7 pages.
"Exploring the Windows Vista Audio Engine", *Microsoft Developer Resources, Hardware Dev Center*, https://msdn.microsoft.com/windows/hardware/drivers/audio/exploring-the-windows-vista-audio-engine, Last updated: Jan. 24, 2017, Accessed on or before: Jan. 30, 2017, 4 pages.
"WDM Audio Terminology", *Microsoft Developer Resources, Hardware Dev Center*, https://msdn.microsoft.com/en-us/windows/hardware/drivers/audio/wdm-audio-terminology, Updated on: Jan. 24, 2017, Accessed on or before: Jan. 30, 2017, 6 pages.
"Loopback Recording", *Microsoft Developer Network*, https://msdn.microsoft.com/en-us/library/ms679146.aspx, Accessed on or before: Jan. 30, 2017, 2 pages.
"Audio Endpoint Builder Algorithm", *Microsoft Developer Resources, Hardware Dev Center*, https://msdn.microsoft.com/en-us/windows/hardware/drivers/audio/audio-endpoint-builder-algorithm, Last updated: Jan. 24, 2017, Accessed on or before: Jan. 30, 2017, 6 pages.
"Audio Processing Object Architecture", *Microsoft Developer Resource, Hardware Dev Center*, https://msdn.microsoft.com/en-us/windows/hardware/drivers/audio/audio-processing-object-architecture, Last updated: Jan. 24, 2017, Accessed on or before: Jan. 30, 2017, 10 pages.
Non-Final Office Action issued in U.S. Appl. No. 15/427,970, dated Sep. 6, 2018, 17 pages.
Final Office Action received in U.S. Appl. No. 15/427,970, dated Feb. 11, 2019, 17 pages.

\* cited by examiner software 180 implementing one or more innovations for managing routing of audio between applications and/or enforcing access restrictions

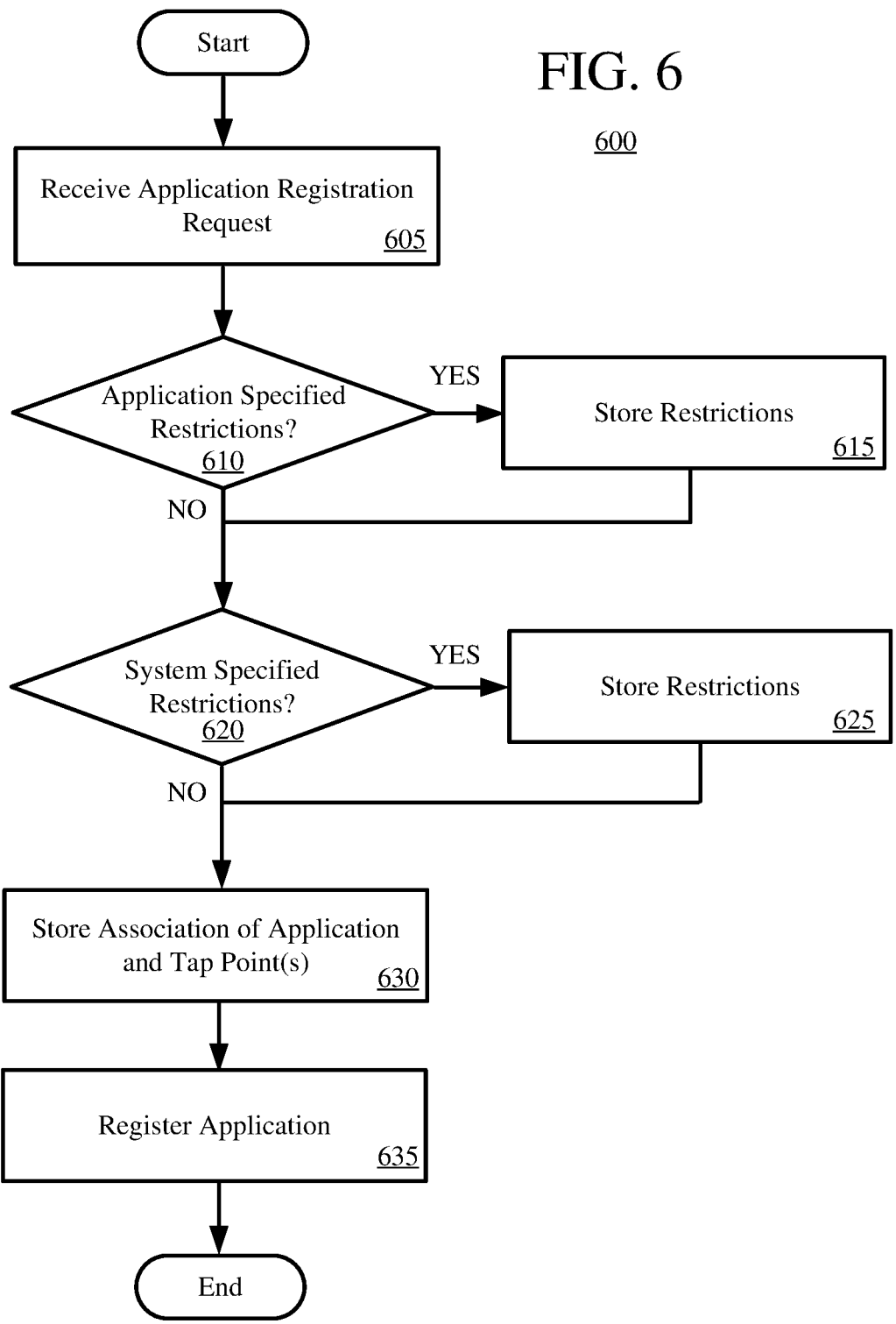

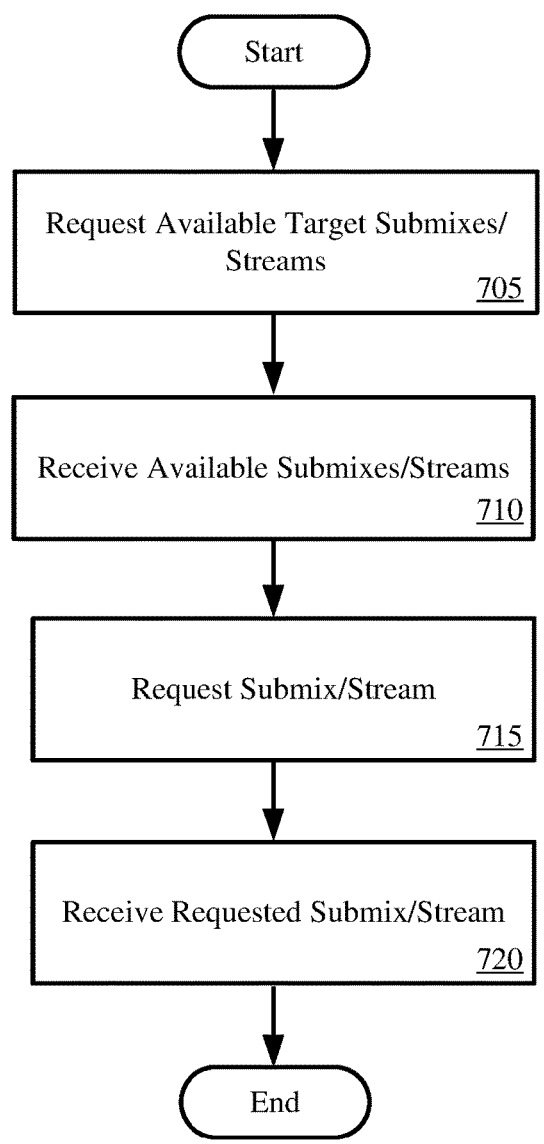

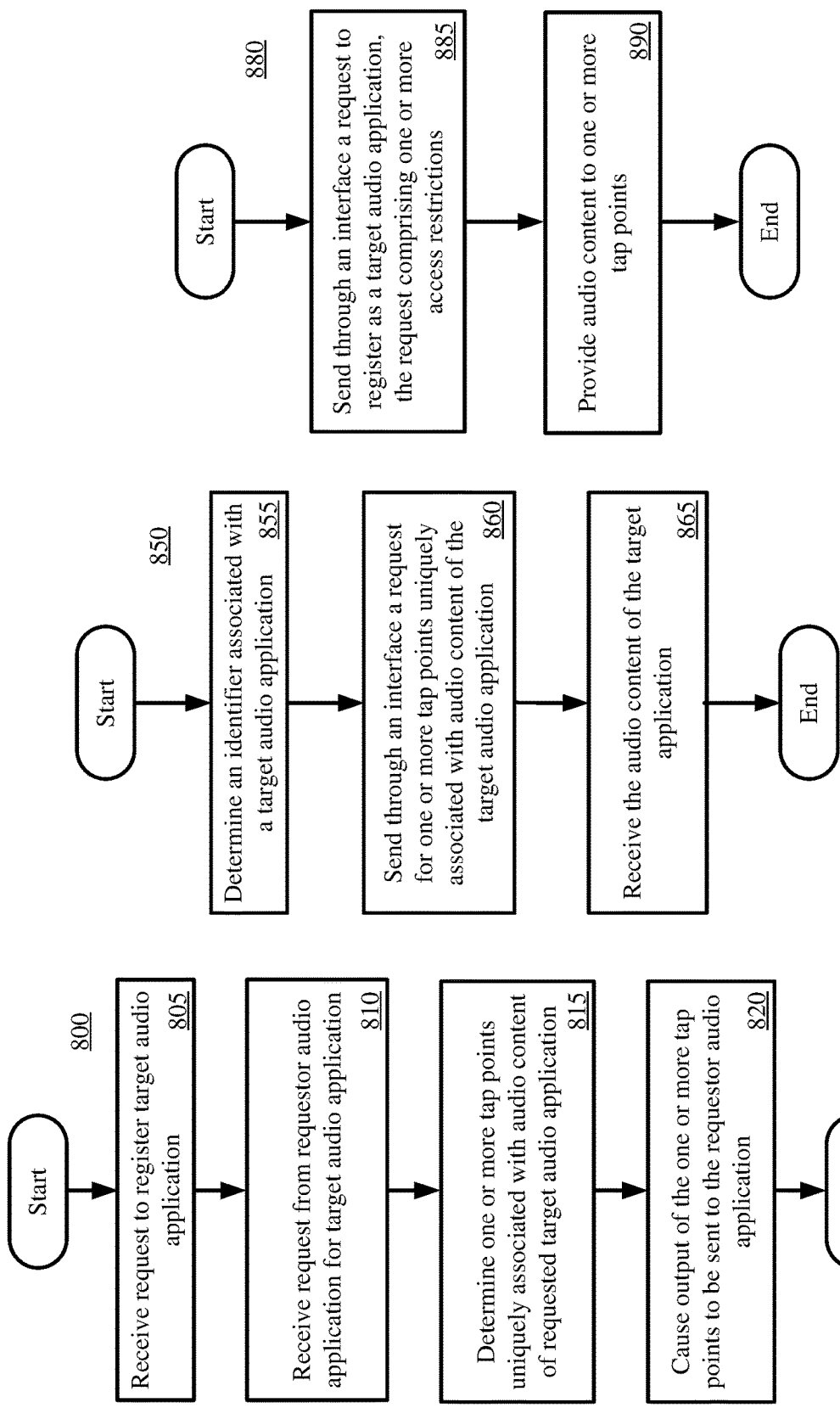

SELECTIVE ROUTING OF AUDIO BETWEEN APPLICATIONS

BACKGROUND

Many modern computer systems, such as through an operating system running on a computer system, provide for the capturing of audio from an input device (e.g., a microphone or other analog or digital input source) and rendering of audio to an output device (e.g., a speaker, headphone jack, or other analog or digital output point, including output to a network). Typical computer systems allow for concurrent access to an audio system by multiple applications or processes. For example, on a single computer device, a user may be simultaneously listening to music (e.g., from a file or using a streaming application), playing a computer game, having a conversation (e.g., using voice over Internet Protocol ("VoIP") software), using a web browser to browse web pages having audio content, and streaming audio and/or video (e.g., "gamecasting").

Typically, for software applications providing audio to be output to particular output devices or locations (e.g., audio endpoints), a computer system will combine audio content destined for each audio endpoint and cause the combined audio content to be rendered to the audio endpoint. For instance, in the above example, at the user's computer, a speaker may output the combined audio from the music source, the game, the conversation, and the web browser. The audio services provided by a computer system typically allow an application to receive the audio content being rendered to a particular audio endpoint, which is sometimes referred to as an audio "loopback." The loopback audio may be recorded by an application, or the loopback audio stream may be used for monitoring audio quality and adjusting application or hardware settings or for audio processing, such as to perform echo cancellation.

Although the loopback audio corresponding to audio rendered to an audio endpoint may be made available to applications, if the loopback audio includes audio content from multiple sources, the audio content specific to an individual application is typically not available to other applications. Although in some cases an application includes functionality to share audio content with another, selected application, such functionality is not generally available (e.g., a feature provided by the computer device, such as by its operating system). Thus, continuing the example above, if a user is gamecasting, the audio content being broadcast is typically the same audio content being rendered by the user's speakers—including not only audio content from the game, and perhaps the user's commentary, but also the music the user is listening to, sounds from web pages the user has open, etc. This can be undesirable for the user, and the user's audience, as it can detract from the broadcasted video.

SUMMARY

In summary, innovations are described for managing the routing of audio content from a target audio application to a requestor audio application. For example, a requestor audio application may specify a target audio application from which audio content is to be received. An audio playback/routing manager can determine the audio content of the target audio application and provide the requested audio content to the requestor audio application. In this way, rather than receiving all of the audio content being rendered to an audio endpoint, which may include audio content of multiple applications, the requestor audio application can receive only audio content of one or more particular, specified target audio applications.

According to one aspect of the innovations, a computer system implements an audio management architecture. The architecture includes an interface configured to receive a request to register a target audio application and a request from a requestor audio application for audio content of the target audio application. In operation, an interface configured in this way can, over time, receive multiple requests to register from multiple, different target audio applications; similarly, it can, over time, receive multiple requests to capture audio content of a single target audio application or multiple target audio applications, from the same requesting audio application or from multiple, different requesting audio applications. The architecture also includes an audio playback/routing manager. The audio playback/routing manager is configured to, in response to a request from a requestor audio application for audio content of a specified target audio application, determine one or more tap points uniquely associated with the audio content of the target audio application. That is, the one or more tap points are associated with the audio content of the target audio application but not with the audio content of any other audio application—the one or more tap points are configured to receive, as one or more inputs, only audio content from the target audio application. The audio playback/routing manager is further configured to cause the output of the one or more tap points to be sent to the requestor audio application.

The interface, audio playback/routing manager, or other components of the architecture can be configured to carry out additional operations. For example, a target audio application can specify one or more access restrictions for its audio content. Or, the audio playback/routing manager or another component of the architecture can specify one or more access restrictions for the audio content of the target audio application. A component of the architecture can determine whether a requestor audio application is authorized to receive the audio content of the target audio application.

In another aspect, the disclosed innovations provide a method for a requestor audio application to request and receive audio content of a particular target audio application. An identifier associated with the target audio application is determined. The requestor audio application sends a request, through an interface, for audio content of the target audio application. The request includes the identifier. The requestor audio application receives, e.g., from one or more (including all) tap points uniquely associated with the audio content of the target audio application, the audio content of the target audio application.

According to another aspect of the innovations, a target audio application can register with an audio playback/routing manager component such that audio content of the target audio application is made available for routing to requestor audio applications. A target audio application sends, through an interface, a request to register the target audio application. The request includes one or more access restrictions. The one or more access restrictions can restrict which requestor audio applications may receive audio content from the target audio application. The target audio application also sends audio content to one or more (including all) tap points created by an audio playback/routing manager component for the target audio application. The one or more tap points can be uniquely associated with the audio content of the target audio application.

The present disclosure also includes computing systems and computer readable storage media configured to carry out, or including instructions for carrying out, an above-described method. The various innovations can be used in combination or separately. As described herein, a variety of other features and advantages can be incorporated into the technologies as desired. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 6 is a flowchart of operations occurring during an example approach to registering a target audio application.

FIG. 7 is a flowchart of operations occurring during an example approach to handling a request by a requestor audio application to receive audio content from a target audio application.

FIGS. 8a, 8b, and 8c are flowcharts illustrating example approaches to routing audio content from a target audio application to a requestor audio application.

DETAILED DESCRIPTION

Innovations are described for managing the routing, or provision, of audio content of a target audio application to a requestor audio application. An audio playback/routing manager manages requests by requestor audio applications for the audio content of target audio applications. The audio playback/routing manager can register target audio applications, including creating one or more tap points or submixes for a given target audio application. The audio playback/routing manager can receive requests from requestor audio applications and, if appropriate (e.g., according to an access policy), provide the requested audio content to the requestor audio application. In common use scenarios, the disclosed audio routing innovations can allow a requestor audio application to receive only audio content of one or more particular target audio applications of interest. So, for example, a requestor audio application that provides gamecasting or other audio/video broadcasts (e.g., online meeting, conference, or other communication tools) can limit the audio content it receives to desired sources, which can improve the quality of the audio/video being broadcast by the requestor audio application.

The various aspects of the innovations described herein include, but are not limited to, the following:

Creating one or more tap points/sub-mixes for a particular target audio application, or particular audio streams of a particular target audio application.

Ways for a target audio application to restrict which requestor audio applications are permitted to receive its audio stream(s).

Ways to provide a system access policy regarding routing of audio stream(s).

Ways for a requestor audio application to request audio content of one or more selected target audio applications, or particular streams thereof.

Ways for a requestor audio application to discover available target audio applications, or individual audio streams thereof.

The various aspects of the innovations described herein can be used in combination or separately. For example, routing of application audio can be implemented without implementing access restrictions.

Example Computer Systems

Figure 1:
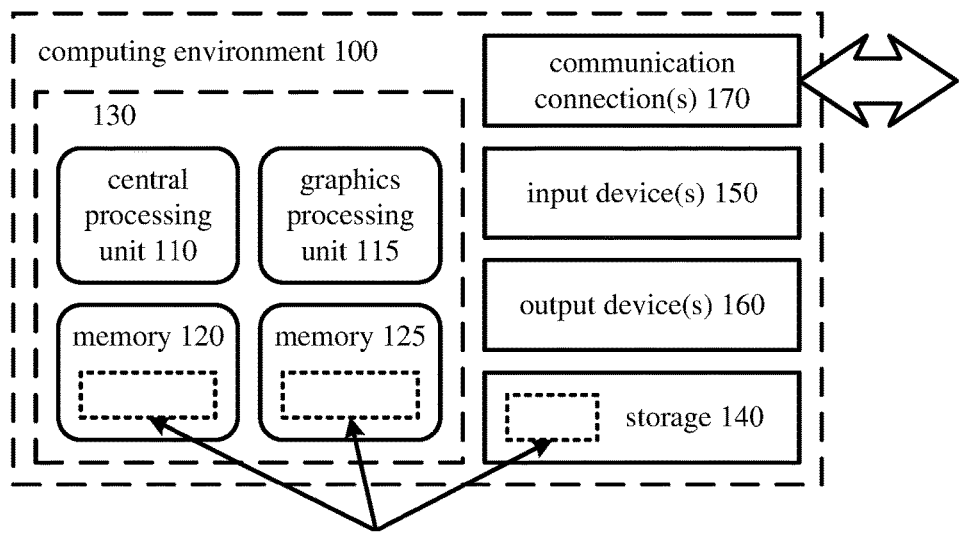
FIG. 1 is a block diagram of an example computer system in which some described innovations may be implemented.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems. Thus, the computer system can be any of a variety of types of computer system (e.g., desktop computer, laptop computer, tablet or slate computer, smartphone, gaming console, etc.).

With reference to FIG. 1, the computer system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for managing routing of audio content between target and requestor audio applications and/or or enforcing access restrictions, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system software (not shown) provides an operating environment for other software executing in the computer system (100), and coordinates activities of the components of the computer system (100). In particular, the other software includes one or more requestor audio applications and one or more target audio applications (a particular audio application can be both a requestor audio application and target audio application for other requestor audio applications). Audio applications can include one or more voice communication applications such as a standalone voice telephony application (VoIP or otherwise), a voice telephony tool in a communication suite, or a voice chat feature integrated into a social network site or multi-player game. The audio applications can also include an audio recording application, a speech-to-text application, or other audio processing software that can use an audio capture feed. Audio applications can also include applications that render audio content, for example, to an audio endpoint, such as media players, games, music production applications, email applications, calendars, contact managers, word processors and other productivity software, Web browsers, and messaging applications.

The tangible storage (140) may be removable or non-removable, and includes magnetic disks, magnetic tapes or cassettes, CD-ROMs, DVDs, or any other medium which can be used to store information and which can be accessed within the computer system (100). The storage (140) stores instructions for the software (180) implementing one or more innovations for managing routing of audio content between target and requestor audio applications and/or or enforcing access restrictions. The storage (140) does not include signals per se.

The input device(s) (150) include one or more audio input devices (e.g., a microphone adapted to capture audio or similar device that accepts audio input in analog or digital form). The input device(s) (150) may also include a touch input device such as a keyboard, mouse, pen, or trackball, a touchscreen, a scanning device, or another device that provides input to the computer system (100). The input device(s) (150) may further include a CD-ROM or CD-RW that reads audio samples into the computer system (100). The output device(s) (160) typically include one or more audio output devices (e.g., one or more speakers). The output device(s) (160) may also include a display, touchscreen, printer, CD-writer, or another device that provides output from the computer system (100).

The communication connection(s) (170) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations of any of the above. None of the computer-readable media herein include signals per se.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or device can be local or distributed, and can include any combination of special-purpose hardware and/or general-purpose hardware with software implementing the functionality described herein.

The disclosed methods can also be implemented using specialized computer hardware configured to perform any of the disclosed methods. For example, the disclosed methods can be implemented by an integrated circuit (e.g., an ASIC such as an ASIC digital signal process unit ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine," "store," "request," and "send" to describe computer operations in a computer system. These terms denote operations performed by a computer, and should not be confused with acts performed by a human being. The actual computer operations corresponding to these terms vary depending on implementation.

Example Software Architectures for Managing Audio Routing

Figure 2:
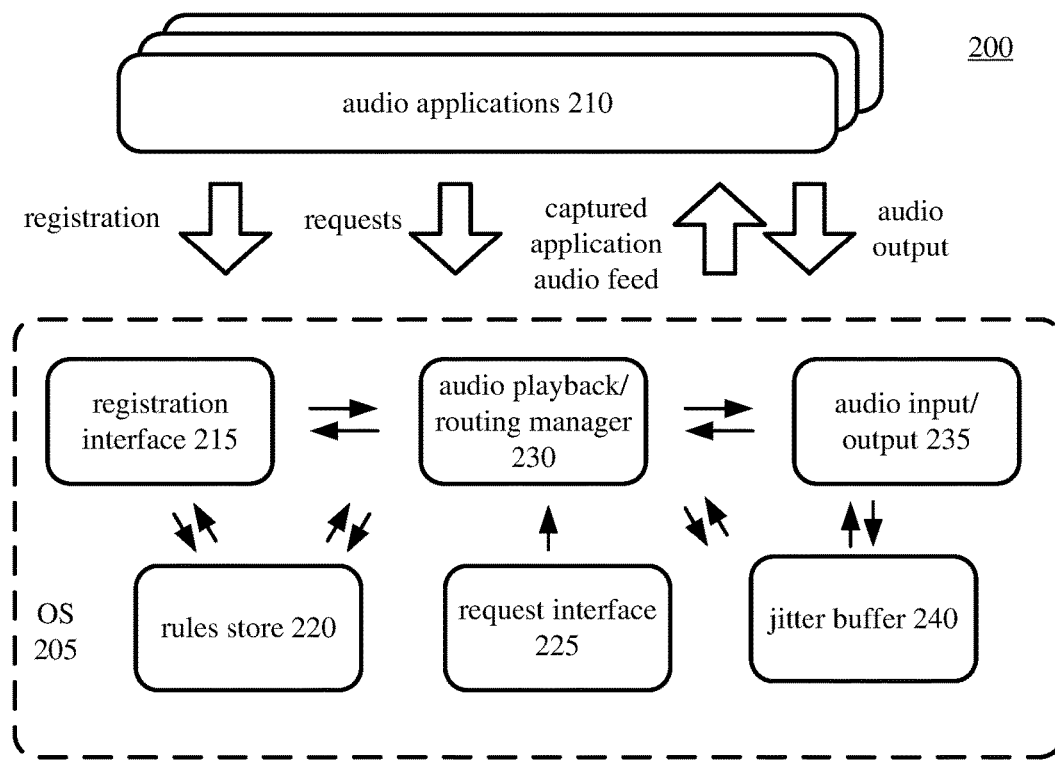
FIG. 2 is a diagram of an example architecture for managing audio playback and routing for audio applications.

FIG. 2 illustrates an example software architecture (200) for the capture of application audio feeds and the routing of captured audio feeds to one or more other applications. A computer system (e.g., desktop computer, laptop computer, netbook, tablet computer, smartphone, game console) can execute software organized according to the architecture (200) to manage audio for one or more audio applications.

The architecture (200) includes an operating system (205) and one or more audio applications (210). An audio application (210) refers to a software application that is capable of, and configured to, provide audio output to the operating system (205) or to an audio endpoint (e.g., a speaker or speaker jack), and/or which is capable of, and configured to, receive audio output from the operating system or directly from an audio endpoint (e.g., an audio input device, such as a microphone). In at least certain aspects, as used herein, an "audio endpoint" refers to a hardware device that lies at one end of a data path that originates or terminates at an audio application (e.g., a target audio application or a requestor audio application).

For example, an audio application (210) can be a voice communication application, such as a standalone voice telephony application (VoIP or otherwise), a voice telephony tool in a communication suite, or a voice chat feature integrated into a social network site or multi-player game. Or, an audio application (210) can be an audio recording application (e.g., for gameplay broadcast), a speech-to-text application, or other audio processing software that can get an audio capture feed. Or, an audio application (210) can be a playback only application, such as a media player.

At least one of the audio application(s) (210) can provide one or more audio streams (e.g., audio output) that can be selectively routed by the operating system (205) to one or more of the other audio applications. An audio application (210) having an audio stream that can be selectively routed by the operating system (205) can be referred to as a target audio application. An audio application (210) that receives an audio feed (e.g., audio content from one or more selected target audio applications, but less than all of the audio content provided to an audio endpoint) can be referred to as a requestor audio application.

An audio application (210) can provide and/or receive one or more audio streams. However, an audio application (210) need not continually have the one or more audio streams, or the number of audio streams may increase or decrease over time. For example, an application may initially start with no audio stream, and one or more streams may be created as the application is executed. The number of streams may change during execution, and the application at some point may cease providing an audio stream (at least for a period of time).

As an example, a music production application (e.g., a digital audio workstation) may initially have no audio streams. As a user composes, the user may create one or more audio streams, such as streams associated with individual instruments or musical components (e.g., rhythm, melody, effects). While in some cases, an audio application (210) providing such functionality may itself mix the various streams, in other cases the audio application (210) can provide multiple streams which may be mixed by the operating system (205) or a hardware component (not shown). The one or more streams associated with a particular audio application (210) can be referred to as a feed or session. In addition to having one or more audio streams, an application can have one or more sessions.

An audio application (210) can register with a registration interface (215) of the operating system (205), including providing permissions information (e.g., access restrictions, access privileges) to be stored in a rules store (220). As needed, the rule store (220) gets rules from local file storage or from network resources. Or, the rules can be hardcoded or hardwired into an audio playback/routing manager (230), as further described below.

The permissions information can include information about whether all or a portion of the audio content from an audio application (210) should (or can) be made available to other applications. For example, the audio application (210) can specify that other audio applications can receive all or a portion of its audio content, that no applications can receive all or a portion of its audio content, or that only certain applications may receive all or a portion of its audio content. Thus, for example, a rule in the rules store (220) can define one or more access restrictions for a target audio application, which may be used to limit access to audio content of the target audio application by requestor audio applications.

When only certain audio applications (210) may receive all or a portion of the audio content of another application, the permitted (or restricted) applications can be specified by an identifier (e.g., name or other identifier) specifically identifying the permitted (or restricted) applications, or a type of application that is permitted (or restricted) can be specified. The type of an audio application (210) can be specified by, for example, a publisher (e.g., applications associated with a particular company), applications complying with a particular access policy (e.g., a digital rights management policy), applications associated with a particular audio endpoint (e.g., only applications providing speaker output), applications associated with a particular purpose (e.g., communication, music composition, gaming, media playback), or applications possessing particular credentials (e.g., a security key or access permission, which may be assigned by the operating system (205)).

As another example, a rule in the rules store (220) can define one or more access privileges for a requestor audio application. The access privilege(s) may be used to limit access to audio content of target audio applications by that requestor audio application.

While in some cases an audio application (210) registering with the operating system (205) can specify access permissions or rules, in other cases, the operating system itself may restrict access to the feed of an audio application (210). The permissions can be defined, at least generally, as described for permissions specified by the audio application (210). For example, the operating system (205) may enforce an access policy (e.g., a digital rights management policy) or may restrict access to the audio feed to those audio application (210) having specific permissions, credentials, audio endpoints, or other features. An access policy can include one or more rules, with each of the rule(s) defining at least one access restriction for a type of audio content, type of audio application, or available target audio application.

A request interface (225) can provide an interface for receiving requests relating to all or a portion of the audio feed of a particular target audio application (210), or for a plurality of individual target audio applications. The requests can be requests for a requestor audio application to receive all or a portion of the audio feed(s) of a target audio application. In some cases, the requests can specify an identifier for a particular target audio application, such as an application name or other identifier, or a name or other identifier of one or more processes associated with the application. In other cases, the request can specify the target audio application in another manner. For example, the request can specify that the target audio application is a foreground (e.g., currently active, in focus, or having a higher priority) application or a background application.

In some cases, the requests can specify a particular stream of an audio application, or can exclude particular streams. For example, streams may be specified based on a type, which can be a format (e.g., an encoding format), classification (e.g., movie, music, communications), clock cycle, or bit rate.

The operating system (205) includes an audio playback/routing manager (230). The audio playback/routing manager (230) can execute (e.g., directly execute or cause to be executed) operations to establish audio playback (e.g., creating paths to audio endpoints), create audio sessions and streams, manage audio processing (including muting all or a portion of audio content of a target audio application (210) or applying effects or other audio processing to all or a portion of an audio feed of an audio application), and/or manage requests by requestor audio applications relating to the routing of all or a portion of the audio content of a target audio application.

In particular, when the request interface (225) receives a request from a requestor audio application (210), the audio playback/routing manager (230) can check the rules store (220) to determine whether the action requested by the requestor audio application (210) is permitted for the requestor audio application and/or permitted for the target audio application(s) associated with the request. If the action is permitted, the audio playback/routing manager (230) can execute (e.g., directly execute or cause to be executed) the appropriate action. For example, if the action is a request for all or a portion of the audio content of a target audio application (210), the requested audio (e.g., session or stream(s)) can be provided to the requestor audio application. The audio so provided can be referred to as a loopback audio stream. In particular aspects, a buffer can be created to receive audio content from the target audio application (210), and audio content can be copied (e.g., on an ongoing basis) from the target audio application (e.g., from a buffer containing audio for the target audio application) to the created buffer. The location of the created buffer can be provided to a requestor audio application (210).

The operating system (205) includes components for rendering (e.g., rendering visual output to a display, generating audio output for a speaker or other audio endpoint), components for networking, components for processing audio capture from a microphone, and components for managing applications. More generally, the operating system (205) manages user input functions, output functions, storage access functions, network communication functions, and other functions for the computer system. The operating system (205) provides access to such functions to an audio application (210). The operating system (205) can be a general-purpose operating system for consumer or professional use, or it can be a special-purpose operating system adapted for a particular form factor of a computer system. In FIG. 2, the audio input/output (235) represents audio capture (e.g., from a microphone or other audio endpoint) or audio routing processing and audio output processing (e.g., the provision of audio content to an audio endpoint, or the routing of audio content from a target audio application to a requestor audio application). The audio input/output (235) conveys audio content to/from the audio application(s) (210) through one or more data paths, as controlled by the audio playback/routing manager (230) through one or more control paths.

The operating system (205) can include a jitter buffer (240). Different audio applications (210) and audio endpoints may operate at different clock frequencies or have different sampling rates. The jitter buffer (240) can be used to correct for such differences between audio content of different sources and/or destinations.

A user can generate user input that affects audio management for voice communication applications and other audio applications. The user input can be tactile input such as touchscreen input, mouse input, button presses or key presses or voice input. For example, a user may initiate or answer a new call in a voice communication application, or terminate a call. Or, the user may move an audio application (210) from the foreground of the UI to the background, or vice versa, or otherwise change the visibility of the application (210). Or, the user may change which application currently has the focus in the UI.

Alternatively, the operating system (205) includes more or fewer modules. A given module can be split into multiple modules, or different modules can be combined into a single module. For example, the audio playback/routing manager (230) can be split into multiple modules that control different aspects of audio management, or the audio playback/routing manager (230) can be combined with another module (e.g., the rules store (220) or registration interface (225)). As another example, the registration interface (215) and request interface (225) can be combined. Functionality described with reference to one module can in some cases be implemented as part of another module. Or, instead of being part of an operating system, the audio playback/routing manager (230) can be a standalone application, plugin or type of other software (e.g., providing a framework or middleware).

In addition, functionality can be added to, or removed from, the architecture (200). For example, in some aspects, the operating system (205) does not provide for access restrictions. In such aspects, the operating system (205) can omit the rules store (220).

Although shown as a single computing system, the architecture (200) can be implemented in a distributed computing system or in embodiments otherwise having multiple computing systems. For example, at least one of the audio applications (210) can be located at a first computing system and can act as a target audio application or a requestor audio application through an appropriate interface (215), (225). For example, interfaces (215), (225) can enable remote procedure calls.

Example Architecture for Providing Access to Audio Content

Figure 3:
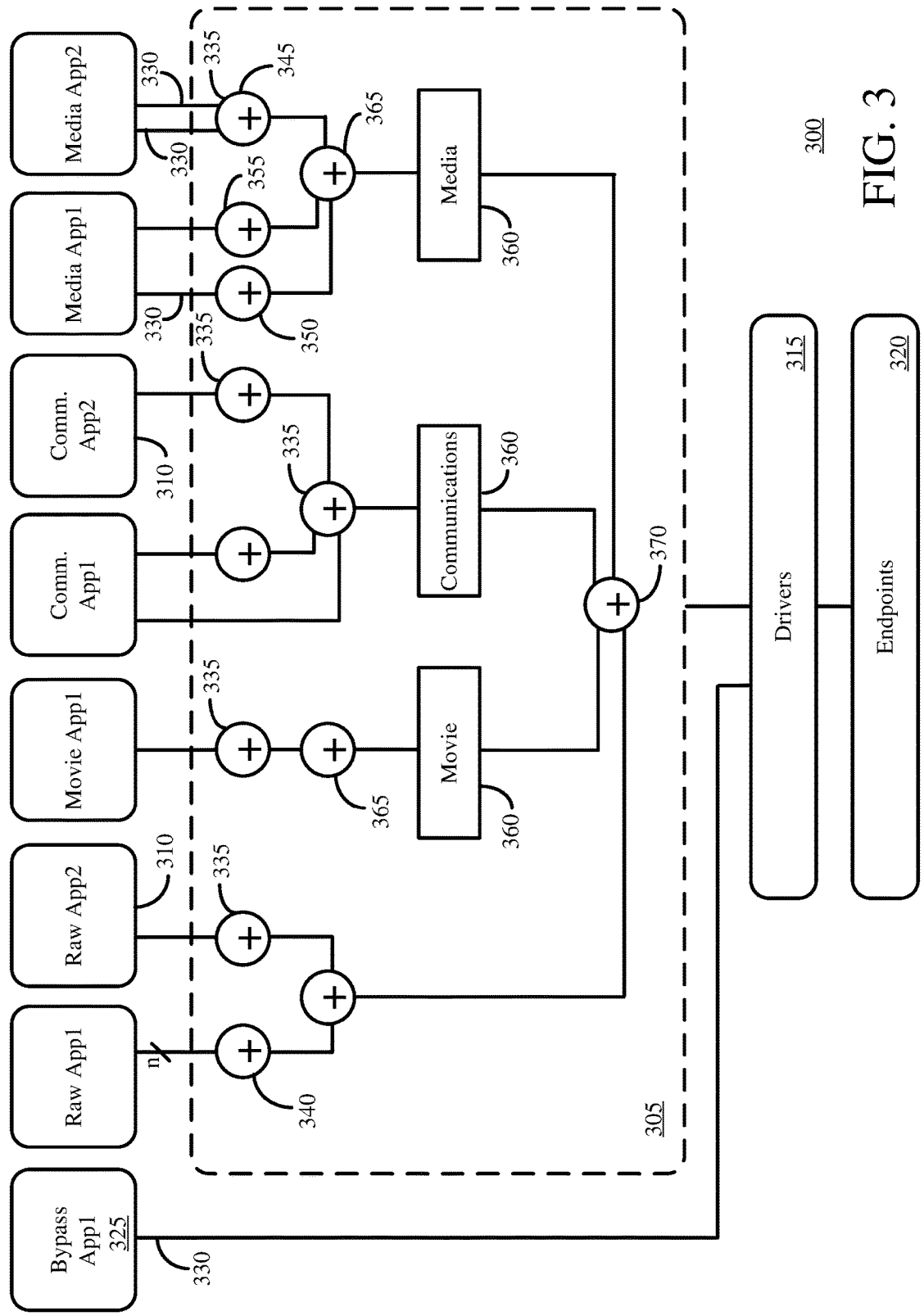
FIG. 3 is a diagram of an example architecture for associating audio tap points, or submixes, with particular audio applications.

FIG. 3 illustrates an example architecture (300) in which an operating system (305) manages audio content for one or more audio applications (310). The operating system (305) can include various components, including the components shown in FIG. 2, such as one or more of the registration interface (215), the rules store (220), the request monitor (225), the audio playback/routing manager (230), the audio input/output (235), or the jitter buffer (240).

The operating system (305) can provide audio output to drivers (315), which in turn can provide audio output to their associated audio endpoint(s) (320). Although FIG. 3 shows the drivers (315) as being outside the operating system (305), the drivers can be considered to be part of the operating system (305). In some cases, the operating system (305) can allow an audio application (310) to send audio content directly to, or receive audio content directly from, one of the drivers (315) for an audio endpoint (320), bypassing the operating system (305). For example, a Bypass App1 (325) is shown as directly connected to the drivers (315). Bypassing the operating system (305) (in particular, the audio engine or stack of the operating system) can be beneficial, for example, when it is desired to have the audio endpoint (320) process the audio content, such as to conserve computing resources on the computer system on which the operating system (305) is installed. An application (310) which bypasses the operating system (305) can also be referred to as an offloaded audio application or a hardware-offloaded audio application.

The remaining audio applications (310) are shown as connected to the drivers (315) and audio endpoints (320) through the operating system (305). Each of the audio applications (310) can have one or more streams (330) (e.g., when sending audio content to, or receiving audio content from, the operating system (305)). Each stream (330) can be connected to one or more tap points or submixes, which are shown as circles with plus signs in FIG. 3 (335). For example, a tap point (335) can provide access to audio content (e.g., a stream, multiple streams, an entire audio feed from a single audio application, the audio feed from multiple audio applications, or the combined audio to be provided to an audio endpoint (320)) that is available for routing, such as to another audio application, or that results in the combination of audio content (e.g., the combination of two or more audio streams, audio feeds, or combinations thereof).

A tap point (335) can be associated with an identifier for each target audio application (310) with which it is associated (e.g., which provides input to the tap point). The identifier can be, for example, a name or other identifier for the target audio application (310), or a name or other identifier of one or more processes associated with the target audio application. A particular tap point (335) can be specified using the identifier(s) for the target audio application(s) (310) providing input to the tap point. Alternatively, a tap point (335) can be specified in another manner, such as using an identifier assigned to the tap point. A data structure can store the association between target audio applications (310) and tap points (335).

FIG. 3 illustrates various ways in which tap points (335), audio applications (310), or streams (330) thereof may interact. In some cases, a tap point (335), such as tap point (340) or (345), receives all of the audio streams (330) from a respective audio application (310) that produces multiple streams. In other cases, a tap point (335), such as tap point (350) or (355), receives audio content for an individual stream (330) of a respective audio application (Media App1, as shown) that produces multiple streams. In still other cases, a tap point (335) receives audio content for an individual stream of an audio application that produces a single stream. As will be further described below, in some implementations, the operating system (305) can include different processing for different types of audio content. The processing is represented by processing blocks (360). Typically, the audio content from each audio application (310), or particular streams (330) thereof, is combined (e.g., using a submix (365)), prior to the audio content being received by the respective processing block (360).

Although the present disclosure is generally described as allowing a requestor audio application (310) to specify a particular target audio application or stream (330) thereof, in some implementations, the requestor audio application may be able to request audio content based on other criteria or characteristics. For example, the requestor audio application (310) may request audio associated with a particular audio mode, in which case it may be routed the audio content associated with a particular tap point (365) associated with the specified processing block (360). Other characteristics that can be specified by the requestor audio application (310) can include access or security policies provided by the operating system (305), or particular types of audio content.

Although, at least in some implementations, the operating system (305) creates a tap point (335) for each audio application (310) (or, in some cases, for each stream (330)), in some cases, at least certain audio applications or streams can lack a tap point that allows specific access to the audio content of the audio application or stream. For example, a stream of Comm App1 is shown as connected directly to the tap point (365) for the communications audio mode processing block (360), without a tap point specific to the stream or Comm App1. A tap point (335) need not be created for a particular audio application (310) or stream (330) when, for example, a rule or policy (e.g., access restrictions specified by the target audio application or by the operating system (305)) indicates that no other applications are allowed to access the specific audio content of that audio application or stream.

In some cases, the tap points (335) can be of the same type, or be created or managed by the same process. The tap points (335) can be, for example, instances of a class or be multiple instances of a process or multiple threads of a process. In other cases, the tap points (335) can have different types, such as being instances of different classes or implemented by different processes. The tap points (335), whether of the same or different types, can be created, managed, and removed by one or more components of the operating system (305) (such as the audio playback/routing manager (230) of FIG. 2).

In a particular example, the tap points (335) can be implemented using, and be instances of, a mixer class. A mixer class object may cause one or more audio inputs (e.g., a stream or a session) to be written to an output buffer (or, in some cases, multiple output buffers). Multiple mixer class objects can write to the same output buffer. Thus, mixer class objects can be used to provide an output representing a single stream, a single session, multiple streams, multiple sessions, or a combination thereof. When the mixer class object is instantiated, the input(s) and output(s) of the instance of the mixer class object can be specified.

The operating system (305) can be configured to automatically create a tap point, or submix, (335) for each audio application (310) or each audio application stream (330). In other implementations, tap points (335) can be created in another manner, such as when a particular target audio application audio feed is requested by a requestor audio application. A tap point (335) can be uniquely associated with a particular audio application (310), and, in some cases, a particular stream (330) of the particular audio application or combination of streams of the particular audio application. That is, the tap point (335) can be associated with the audio content of the particular audio application (including one or more of its streams) but not with the audio content of any other audio application, in which case the tap point is configured to receive, as one or more inputs, only audio content from the particular audio application.

As will be further described, if an audio application (310) (e.g., a requestor audio application) wishes to receive audio content from one or more target audio applications, the requestor audio application can specify the desired target audio application(s). The operating system (305), such as using the audio playback/routing manager (230), can return the audio content of a target audio application (310) (e.g., from output of a tap point (335) for a specific stream (330) of the target audio application (310), a tap point for multiple specified streams (330) of the target audio application (310), or a tap point for an entire feed or session of the target audio application (310).

This aspect of the present disclosure can provide a number of advantages. For example, a requestor audio application (310) can obtain audio content from a target audio application even if the target audio application did not specifically request the creation of a tap point (335) for its audio output, and without having to manually create such as tap point. Also, a requestor audio application (310) can lack information about a specific tap point (335) for a desired target audio application. The ability to obtain audio content of a specific target audio application (310) overcomes this issue, as the requestor audio application only needs to specify the target audio application (or a stream thereof), rather than having to specify a particular tap point (335).

As described above, in some cases, the operating system (305) can include different modes for different types of audio content. For example, the audio system (305) may process audio content differently depending on the type of content or application (e.g., use) with which it is associated. These categories can include speech or voice content, soundtrack for movie or video content, music or other media content, game content, system audio (e.g., audio notifications), and others. The operating system (305) can include a default category for unclassified audio applications (310) or audio applications not otherwise associated with another category. The operating system (305) can also include a category (e.g., raw audio) for audio content that is to be left unprocessed, or minimally processed. A tap point (365) can be included before each processing block (360) for the respective audio mode, receiving all of the streams or audio feeds associated with the respective audio mode.

Typically, all of the tap points (335) in the operating system (305) are connected at a master submix node or tap point (370) (which can be, for example, an instance of the mixer class described above). The audio content formed at master tap point (370) is typically the audio provided by the operating system (305) to the drivers (315) to be sent to one or more of the audio endpoints (320). The audio content formed at the master tap point (370) is also the audio content (e.g., a loopback) that has been previously provided to a requesting audio application.

As discussed above, different audio applications (310), streams thereof, or audio endpoints (320) may operate using different frequencies, thus having audio content with different sampling rates. When audio content is combined, if the audio sources have different sampling rates, they can be reconciled to a common sampling rate using a jitter buffer (e.g., jitter buffer (240) of FIG. 2).

Example Architecture for Routing Application Audio

Figure 4:
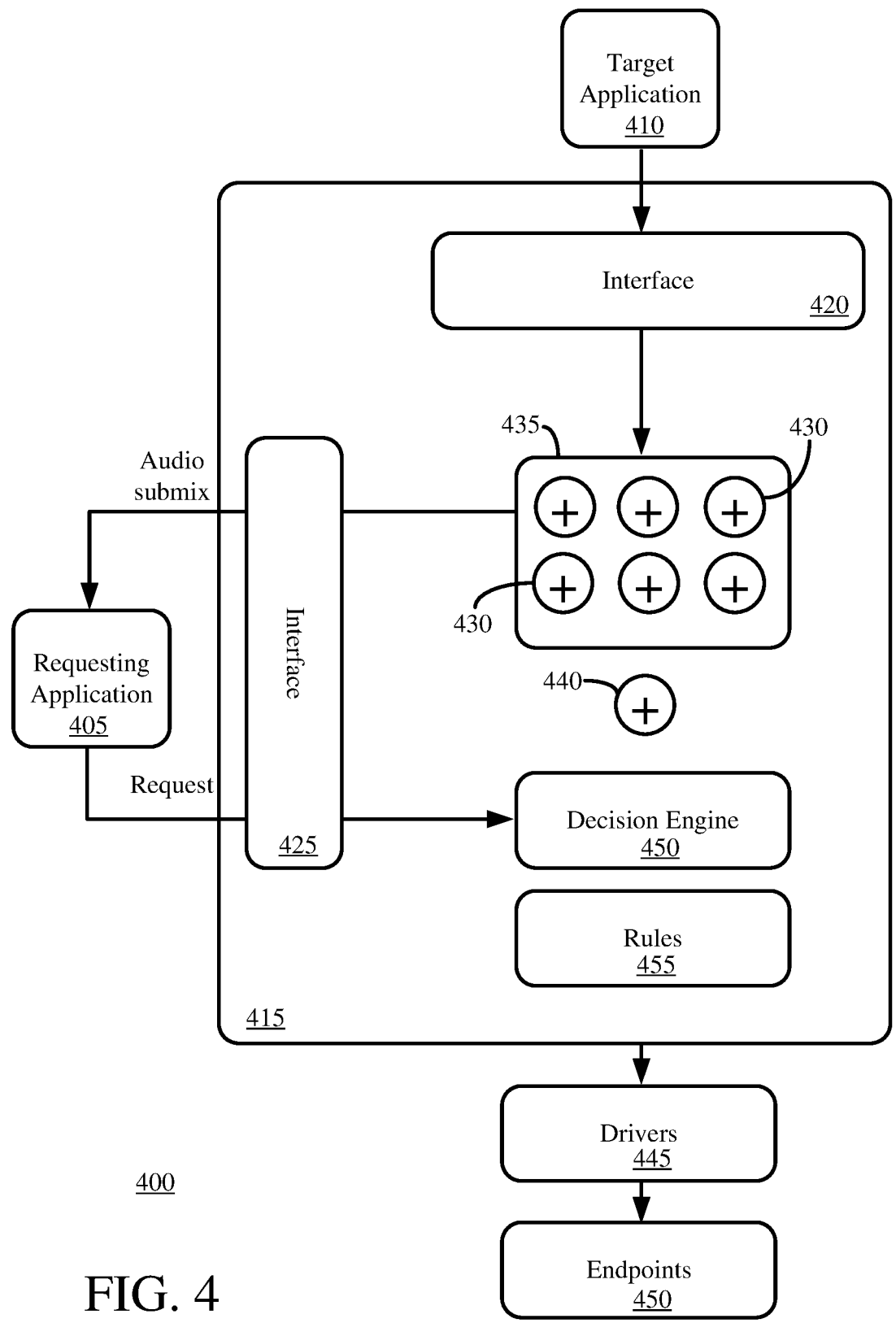
FIG. 4 is a diagram of an example architecture for routing audio content from a target audio application to a requestor audio application.

FIG. 4 illustrates an example architecture (400) that allows a requestor audio application (405) to receive audio content of a target audio application (410) from an operating system (415) through interfaces (420), (425).

As described above, the target audio application (410) can register with the operating system (415), such as through the interface (420). For example, the target audio application (410) can make a request for an audio stream or session to be created. As part of the registration, the operating system (415) can create a tap point (430) for the target audio application (410), or a tap point for each of one or more streams of the target audio application (410). Each such tap point is uniquely associated with the audio content of the target audio application (410), in that the tap point is configured to receive, as one or more inputs, only audio content from the target audio application (410) (and not any other audio application).

The operating system (415) can maintain a store (435) (e.g., a list, graph, tree, heap, or other data structure) of available tap points (430), or submixes. In addition to tap points (430) for particular target audio applications (410), or target audio application streams, the store (435) can include tap points (430) for combinations of audio streams or feeds from multiple target audio applications (410). For example, some of the tap points (430) may represent combinations of feeds or streams associated with a particular type of audio or audio processing mode. The operating system (415) can also implement a general or overall tap point (440), which can represent the overall audio content produced by the operating system (415), such as audio content to be sent to a driver (445) to be rendered at a particular audio endpoint (450).

The operating system (415) can implement a decision engine (450). The decision engine (450) can be, for example, a function provided by (or component of) the audio playback/routing manager (230) of FIG. 2. The decision engine (450) can communicate with a rules store (455) (e.g., the rules store (200)), which can store routing rules (for access permissions) provided by target audio applications (410) through the interface (420) or routing rules provided by the operating system (415) (e.g., for access permissions derived from an access policy). For example, when a target audio application (410) calls a method of the interface (420) to create an audio session or stream, or otherwise register with the operating system (415), the target audio application can include a stream flag or permissions indicator that can be stored in the rules store (455).

The requestor audio application (405) can request audio content of one or more target audio applications (410) through the interface (425). Although shown as separate, in some cases, all or a portion of both interfaces (420), (425) can be implemented in a single interface. One form of the request can be:

ActivateApplicationLoopbackClient(PWSTR appId, IAudioClient**ppAudioClient);

where ActivateApplicationLoopbackClient is the interface method to obtain audio content from a target audio application (410), appID is an overall identifier of type PWSTR for the target audio application (410) (which can be associated with one or more processes, files, windows, and combinations thereof), and ppAudioClient is used to store a pointer to an interface that includes information about a location (e.g., a buffer) to which audio content from the target audio application (410) is to be output, or a pointer to an abstract data type holding information about the output audio stream for a tap point uniquely associated with the audio content of the target audio application (410**) (optionally including a pointer to a buffer to which the audio content is to be output).

Another form of the request can be:

ActivateApplicationLoopbackClient(DWORD processId, IAudioClient**ppAudioClient);

where ActivateApplicationLoopbackClient is the interface method to obtain audio content from a target audio application (410), processId is an identifier of type DWORD for a particular process (e.g., a process associated with the target audio application (410)), and ppAudioClient is used to store a pointer to an interface that includes information about a location (e.g., a buffer) to which audio content from the target audio application (410) is to be output, or a pointer to an abstract data type holding information about the output audio stream for a tap point uniquely associated with the audio content of the target audio application (410**) (optionally including a pointer to a buffer to which the audio content is to be output).

Yet another form of the request can be:

ActivateApplicationLoopbackClient (DWORD*processIds, UINT32 count, IAudioClient**ppAudioClient);

where ActivateApplicationLoopbackClient is the interface method to obtain audio content from one or more target audio applications (410), *processIds references an array that holds identifiers of type DWORD for one or more processes running the target audio application(s) to be included in the audio content routed to the requestor audio application (405), UNIT32 count holds the number of processes for which audio content is to be retrieved, and ppAudioClient is used to store a pointer to an interface that includes information about a location (e.g., a buffer) to which audio content from the target audio application(s) (410**) is to be output, or a pointer to an abstract data type holding information about the output audio stream for a tap point (optionally including a pointer to a buffer to which the audio content is to be output).

When a request is made by the requestor audio application (405) for audio content of a target audio application (410), the decision engine (450) can analyze the request to determine whether the request should be fulfilled. For example, the decision engine (450) can compare information associated with the request to one or more rules of the rules store (455) associated with the requestor audio application (405) and/or to one or more rules of the rules store (455) associated with the target audio application (410) specified in the request, in order to determine whether the requestor audio application (405) is permitted to receive the audio content of the target audio application (410). If the request is authorized, the requestor audio application (405) can be sent the audio content of the requested target audio application (410), such as being connected to the relevant tap point (e.g., receiving a location of a buffer to which audio content of the target audio application, such as the contents of a buffer associated with the target audio application, is copied, including on an ongoing basis). If access is not authorized, the method call can fail, and, optionally, an error message or indicator can be provided to the requestor audio application (405).

Process for Routing Application Audio

Figure 5:
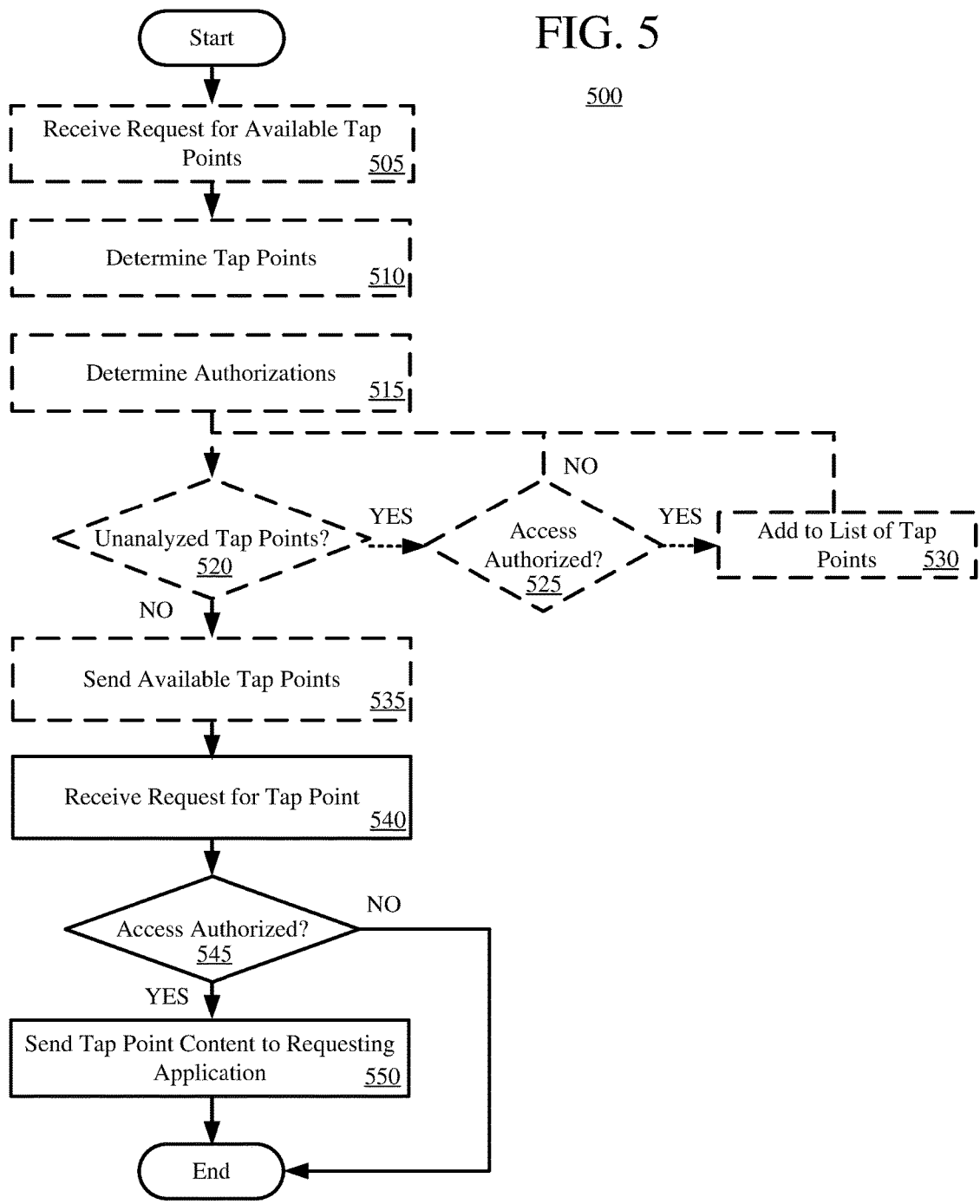
FIG. 5 is a flowchart of operations occurring during an example approach to routing audio content from a target audio application to a requestor audio application.

FIG. 5 is a flowchart of operations (500) occurring in response to a request by a requestor audio application to receive audio content (e.g., an audio feed or session or a particular audio stream or streams) from a specified target audio application (or multiple target audio applications). The operations (500) can be carried out by a component of an operating system, such as the audio playback/routing manager (230) of FIG. 2 or the decision engine (450) of FIG. 4.

In some cases, a requestor audio application can request a list of tap points for available target audio application, which can represent a session associated with a particular target audio application, one or more streams associated with a particular target audio application, or sessions, streams, or a combination thereof, of multiple target audio applications. The requestor audio application can then make a request for a particular tap point. In other cases, the requestor audio application can request a tap point without first requesting a list of available audio tap points.

FIG. 5 depicts both scenarios. Operations associated with the scenario of a requestor audio application first requesting a list of tap points for available target audio application are shown as optional, in dashed lines. Taking this scenario first, at (505), a request from a requestor audio application for a list of tap points for available target audio application is received. At (510), available tap points are determined. Authorizations associated with the available tap points and the requestor audio application are determined at (515). For example, access policies and/or rules associated with the available tap points can be retrieved from a rules store (e.g., rule store (220) or (455), or one or more access privileges or traits of the requestor audio application can be determined.

In general, tap points and authorizations for tap points may be analyzed offline, and the results of the analysis can be quickly checked when a request is received. At (520), it is determined whether any unanalyzed tap points are available. If so, at (525), for an unanalyzed tap point, it is determined whether the requestor audio application is authorized to access the tap point. For example, it can be determined whether the requestor audio application has a suitable identifier or access privileges to access the tap point and receive the output of the tap point. If access is not authorized, execution can return to (520) to determine whether any further unanalyzed tap points are available. If access to the tap point is determined at (525) to be authorized, the tap point can be added to a list of accessible tap points at (530). Execution can then return to (520) to determine whether any further unanalyzed tap points are available.

If, at (520), it is determined that there are no unanalyzed tap points, the list of tap points accessible by the requestor audio application is sent to the requestor audio application at (535). If no tap points are accessible to the requestor audio application, the requestor audio application can be returned an empty list, an error message, or the request can be indicated as having failed (e.g., returning a value of FALSE).

As mentioned above, operations (505)-(535) can be omitted in at least some implementations. For example, a requestor audio application may obtain information sufficient to identify a target audio application from which audio is to be requested in another manner. A requestor audio application may retrieve a list of application identifiers for available application or a list of process identifiers for available processes using another operating system interface, for example. The requestor audio application can include a list of process names or handles from which the application may request audio content, or such information can be supplied to the requestor audio application, such as by another application or through user input.

If audio content for a particular target audio application is to be accessed, the requestor audio application can make a call to the operating system to determine whether the target audio application (or one of its associated processes) is running. If the target audio application (or process) is running, the operating system can return an identifier for the target audio application (or process), which the requestor audio application can use to request the corresponding audio content. Or, the requestor audio application can determine the status of all or a portion of the potential target audio applications on its list, and provide information, such as to a user, for selection of a target audio application from which audio content should be sent.

In either scenario, at (540), a request is received from a requestor audio application for audio content associated with a particular tap point of a target audio application. The request typically specifies the tap point indirectly, but in some cases can specify the tap point directly (e.g., using an identifier for a particular buffer or other point in an audio path). When the tap point is specified indirectly, it can be specified, in various examples, using an application name, another application identifier, a process name or handle, another process identifier, or another identifier (e.g., an identifier for a particular audio mode), or combinations thereof.

In some cases, such as if not previously determined by the operations (500) (e.g., at (525)), it can be determined at (545) whether the requestor audio application is authorized to access the requested tap point. The determination can include comparing identifiers or characteristics of the requestor audio application with access rules associated with the target audio application for the requested tap point. If multiple tap points are requested, the requestor audio application can be analyzed in view of the rules for each of the target audio applications for the requested tap points. If the requestor audio application is not authorized to access audio content of one of the target audio applications, access to the tap point for that target audio application is not authorized, which may affect access to another, downstream tap point.

Even if access authorization was determined at (525), in at least some cases, the access authorization at (545) is carried out. For example, the request received at (540) may be for a tap point that was not in the list returned to the requestor audio application at (525). In some cases, the access authorization of (545) can be omitted even if no other access authorization was performed. For example, in some implementations, the operating system does not provide or enforce access restrictions. Or, the requestor audio application may have global access privileges, such that individual access authorizations need not be determined.

If the access authorization (545) is performed and access is not authorized, the operations (500) can terminate. In some cases, the requestor audio application can be provided a notification that the request has failed, such as an error message or returning an error flag (e.g., returning a value of FALSE). If the access authorization (545) is performed and access is authorized, or if the access-check operation (545) is omitted, audio content associated with the requested tap point(s) is sent to the requestor audio application at (550).

Process for Registering Target Audio Application

FIG. 6 is a flowchart of operations (600) occurring at an operating system in response to a request by a target audio application to register with the operating system. The request may be, for example, a request to establish an audio session, an audio stream, or create a node (or other audio path element) that is associated with the target audio application. The operations (600) can be carried out by a component of an operating system, such as the audio playback/ routing manager (230) of FIG. 2 or the decision engine (450) of FIG. 4.

At (605), a request is received to register a target audio application. It is determined at (610) whether the registration request includes, or the target audio application otherwise specifies, one or more access restrictions. If access restriction(s) are specified, they are stored in associated with the application (e.g., stored in association with an application identifier, such as an application name or handle, or a process identifier, such as a name, of a process associated with the application) at (615).

At (620), it is determined whether there are any access restrictions specified by a system for the target audio application, such as according to an operating system access policy. If any access restrictions are specified by the system, they are stored in association with the application (e.g., stored in association with an application identifier, such as an application name or handle, or process identifier, such as a name, of a process associated with the application) at (625). One or more tap points are created for the target audio application. The association of the target audio application and tap point(s) is stored at (630). For example, a tap point can have an identifier, which can be stored in association with an identifier for the application, such as an application name or handle. The target audio application is registered with the operating system at (635). For example, the audio session, stream, or node requested by the target audio application can be created. The target audio application can be made available for routing requests by requestor audio applications after registration at (635).

Process for Requesting Routing of Audio Content of Target Audio Application

FIG. 7 is a flowchart of operations (700) occurring at a requestor audio application during a request by the requestor audio application for audio content of a target audio application. In some cases, the requestor audio application may first request from the operating system a list of target audio applications, or individual streams thereof. In other cases, the requestor audio application can directly specify the target audio application (or stream thereof) without first requesting a list of target audio applications or available streams. For example, the target audio system can obtain information regarding available target audio applications and streams in another manner Or, the requestor audio application may store information regarding target audio applications for which it makes the request.

In the scenario where the requestor audio application obtains information about available target audio applications from an operating system, the requestor audio application can issue the request at (705). The requestor audio application receives information regarding available target audio applications (and their tap points, streams, etc.) at (710). The requestor audio application sends a request to the operating system at (715) for the audio content of the target audio application. The requestor audio application receives the requested audio content at (720). For example, the operating system may provide the location of a buffer containing the requested audio content.

Generalized Techniques for Routing of Application Audio

FIG. 8a is a flowchart of operations (800) occurring at an audio playback/routing manager component, such as a component of an operating system, during routing of audio content from a target audio application to a requestor audio application. At (805), the audio playback/routing manager component receives a request to register a target audio application. The request may be, for example, a request by the target audio application to access services of an audio system (e.g., an audio system provided by the operating system), such as to receive audio content from a capture endpoint or provide audio to a rendering endpoint.

The audio playback/routing manager component, at (810) receives a request from a requestor audio application for audio content from the target audio application. The request can specify the identity of the target audio application, such as using an application identifier or an identifier for one (or more) processes associated with the target audio application. At (815), the audio playback/routing manager component determines one or more tap points uniquely associated with the audio content of the requested target audio application. The audio playback/routing manager component, at (820), causes the output of the one or more tap points to be sent to the requestor audio application (e.g., to a location or destination, such as a buffer, specified by the requestor audio application).

FIG. 8b is a flowchart of operations (850) occurring at a requestor audio application during routing of audio content from a target audio application to the requestor audio application. At (855), the requestor audio application determines an identifier associated with the target audio application. The identifier may be, for example, an application name, other application identifier, a process name, or other process identifier. The requestor audio application can, at (860) send through an interface a request for audio content of the target audio application. The request can include the identifier of the target audio application, and can be provided by the interface to an audio playback/routing manager component, which may be, for example, a component of an operating system.

At (865), the requestor audio application receives the audio content of the target audio application. For example, the requestor audio application receives the audio content from one or more (including all) tap points uniquely associated with the audio content of the target audio application. Receiving the audio can include receiving the contents of a buffer, or receiving the address (e.g., via a pointer) of a buffer containing the request audio content. In some cases, rather than directly receiving the audio content, the requestor audio application can specify a location (e.g., a buffer) to receive the requested audio content.

FIG. 8c is a flowchart of operations (880) occurring at a target audio application during routing of audio content from the target audio application to a requestor audio application. At (885), the target audio application sends through an interface a request to register the target audio application. For example, the request may be a request to access services of an audio playback/routing manager component, which may be, for example, a component of an operating system. The request can include one or more access restrictions. The access restriction(s) can specify, for example, that audio content from the target audio application is not available for routing to requestor audio applications, or that audio content may only be routed to particular requestor audio applications such as particular types of requestor audio applications. The target audio application, at (890), provides audio content to one or more tap points created by the audio playback/routing component. For example, the one or more tap points are uniquely associated with the audio content of the target audio application.

Alternatives and Variations

Various alternatives to the foregoing examples are possible.

Although the operations of some of the disclosed techniques are described in a particular, sequential order for convenient presentation, it should be understood that this manner of description encompasses rearrangement, unless a particular ordering is required. For example, operations described sequentially may in some cases be rearranged or performed concurrently. Also, operations can be split into multiple stages and, in some cases, omitted.

The various aspects of the disclosed technology can be used in combination or separately. Different embodiments use one or more of the described innovations. Some of the innovations described herein address one or more of the problems noted in the background. Typically, a given technique/tool does not solve all such problems.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing units and memory, wherein the computer system implements an audio management architecture, the architecture comprising:
one or more interfaces configured to:
receive a request to register a target audio application; and
receive a request from a requestor audio application for audio content of the target audio application; and
an audio playback/routing manager configured to, in response to the request from the requestor audio application for audio content of the target audio application:
from a plurality of tap points associated with an audio system of the computer system and in communication with a master tap point, determine one or more tap points uniquely associated with the target audio application, the plurality of tap points associated with the audio system further comprising a tap point for the requestor audio application that is in communication with the master tap point, the master tap point being in communication with one or more audio endpoints; and
cause output of the one or more tap points uniquely associated with the target audio application to be sent to the requestor audio application.

2. The computer system of claim 1, the audio playback/routing manager being further configured to, in response to the request from the requestor audio application for audio content of the target audio application:
determine one or more access restrictions associated with the target audio application; and
determine if the one or more access restrictions permit the requestor audio application to receive the output of the one or more tap points uniquely associated with the target audio application.

3. The computer system of claim 2, the audio playback/routing manager being further configured to, in response to the request from the requestor audio application for audio content of the target audio application:
determine one or more access privileges associated with the requestor audio application; and
determine if the one or more access privileges permit the requestor audio application to receive the output of the one or more tap points uniquely associated with the target audio application.

4. The computer system of claim 1, wherein the request to register the target audio application includes one or more access restrictions for the target audio application, the audio playback/routing manager being further configured to, in response to the request to register the target audio application:
store, in a rules store, the one or more access restrictions in association with an identifier of the target audio application.

5. The computer system of claim 1, the audio playback/routing manager being further configured to, in response to the request to register the target audio application:
determine one or more access restrictions associated with the target audio application; and
store, in a rules store, the one or more access restrictions in association with an identifier of the target audio application.

6. The computer system of claim 5, wherein the determining the one or more access restrictions associated with the target audio application comprises retrieving and applying an access policy for the architecture, the access policy including one or more rules, each of the one or more rules defining at least one access restriction for a type of audio content, type of audio application, or available target audio application.

7. The computer system of claim 1, the audio playback/routing manager being further configured to:
create the one or more tap points uniquely associated with the target application when the request to register the target audio application is received.

8. The computer system of claim 1, the audio playback/routing manager being further configured to, in response to the request from the requestor audio application for audio content of the target audio application, create a buffer to receive audio content routed from the target audio application and copy the audio content of the target audio application to the buffer.

9. The computer system of claim 1, wherein the request for audio content of the target audio application comprises an application identifier of the target audio application.

10. The computer system of claim 1, wherein the request for audio content of the target audio application comprises a process identifier of a process, the process being associated with the target audio application.

11. The computer system of claim 1, wherein the request for audio content of the target audio application comprises an audio stream identifier of an audio stream, the audio stream being associated with the target audio application.

12. The computer system of claim 1, wherein the audio content of the target audio application includes multiple audio streams from the target audio application, and wherein the one or more tap points uniquely associated with the target audio application are configured to mix the multiple audio streams to produce the output of the one or more tap points uniquely associated with the target audio application.

13. In a computer system, a method for selectively receiving audio content of a target audio application, the method comprising, with a requestor audio application:
determining an identifier associated with a target audio application, the target audio application having one or more tap points uniquely associated with the target audio application, the target audio application being in communication with a master tap point, the master tap point being in communication with one or more audio endpoints and with a tap point for the requestor audio application;
sending, though an interface, a request for audio content of the target audio application, the request comprising the identifier; and
receiving, from the one or more tap points uniquely associated with the target audio application, the audio content of the target audio application.

14. The method of claim 13, wherein the identifier comprises an application identifier.

15. The method of claim 13, wherein the identifier comprises a process identifier of a process, the process being associated with the target audio application.

16. The method of claim 13, wherein receiving the audio content of the target audio application comprises receiving a location of a buffer holding a copy of the audio content of the target audio application.

17. The method of claim 13, further comprising, with the requestor audio application:
requesting information regarding available target audio applications; and
receiving the information regarding available target audio application, wherein the information comprises identifiers for the available target audio applications.

18. One or more computer-readable media storing computer-executable instructions for causing a computer system, when programmed thereby, to perform operations comprising, with a target audio application:
sending, through an interface, a request to register the target audio application, the request comprising one or more access restrictions limiting access to audio content of the target audio application; and
sending audio content to one or more tap points created by an audio playback/routing manager component, the one or more tap points being uniquely associated with the target audio application, the target audio application being in communication with a master tap point, the master tap point being in communication with one or more audio endpoints and with tap points associated with one or more requestor audio applications.

19. The computer-readable medium of claim 18, wherein the one or more access restrictions specify an access policy of an operating system.

20. The computer-readable medium of claim 19, wherein the access policy is a digital rights management policy.

\* \* \* \* \*